Dec. 17, 1957 W. C. WOLF 2,816,688
NEWSPAPER DISPENSING APPARATUS
Filed March 17, 1954 5 Sheets-Sheet 1
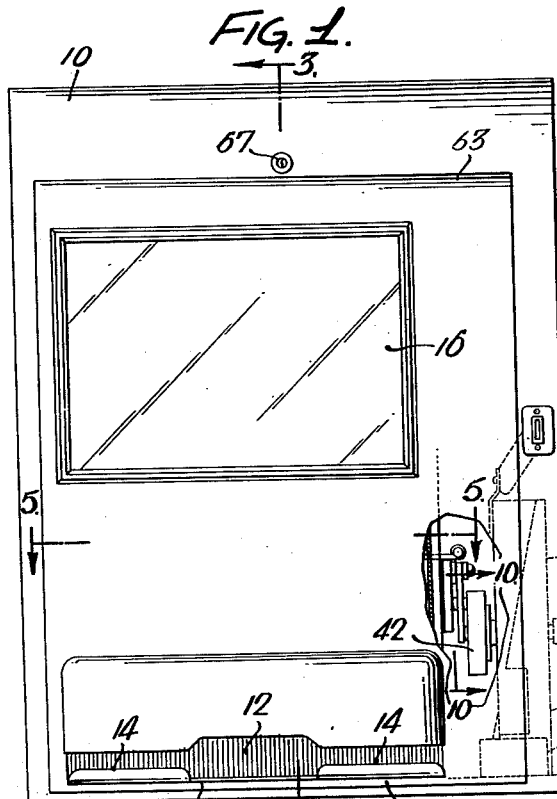
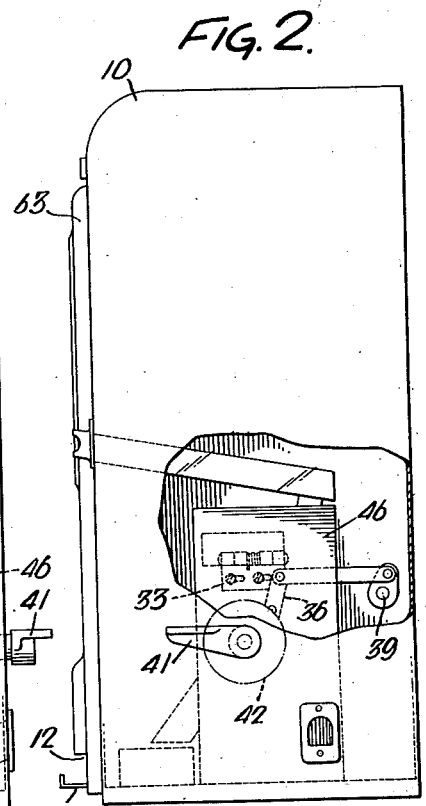
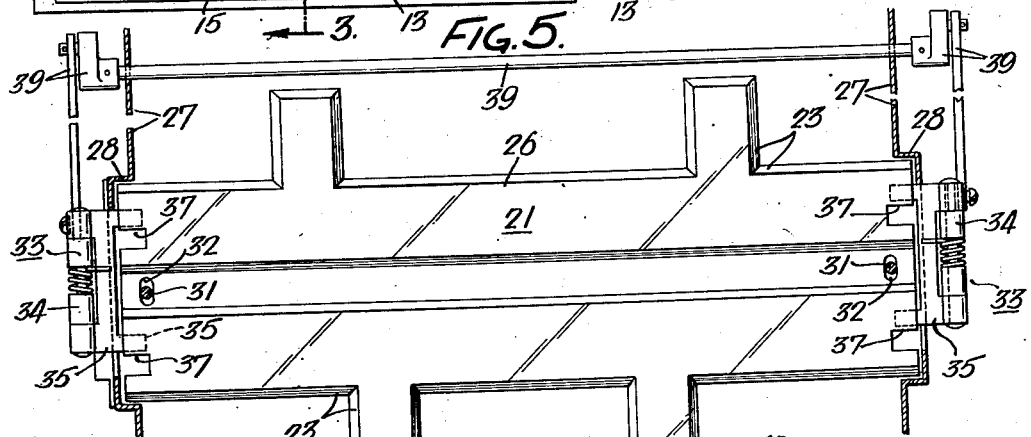
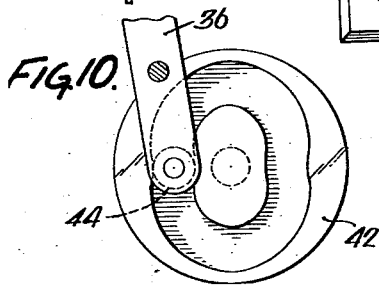
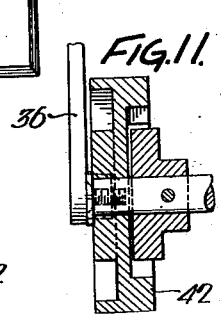
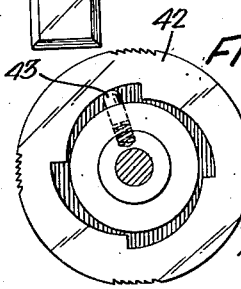
Inventor
William C. Wolf
by his Attorneys
Howson &
Howson

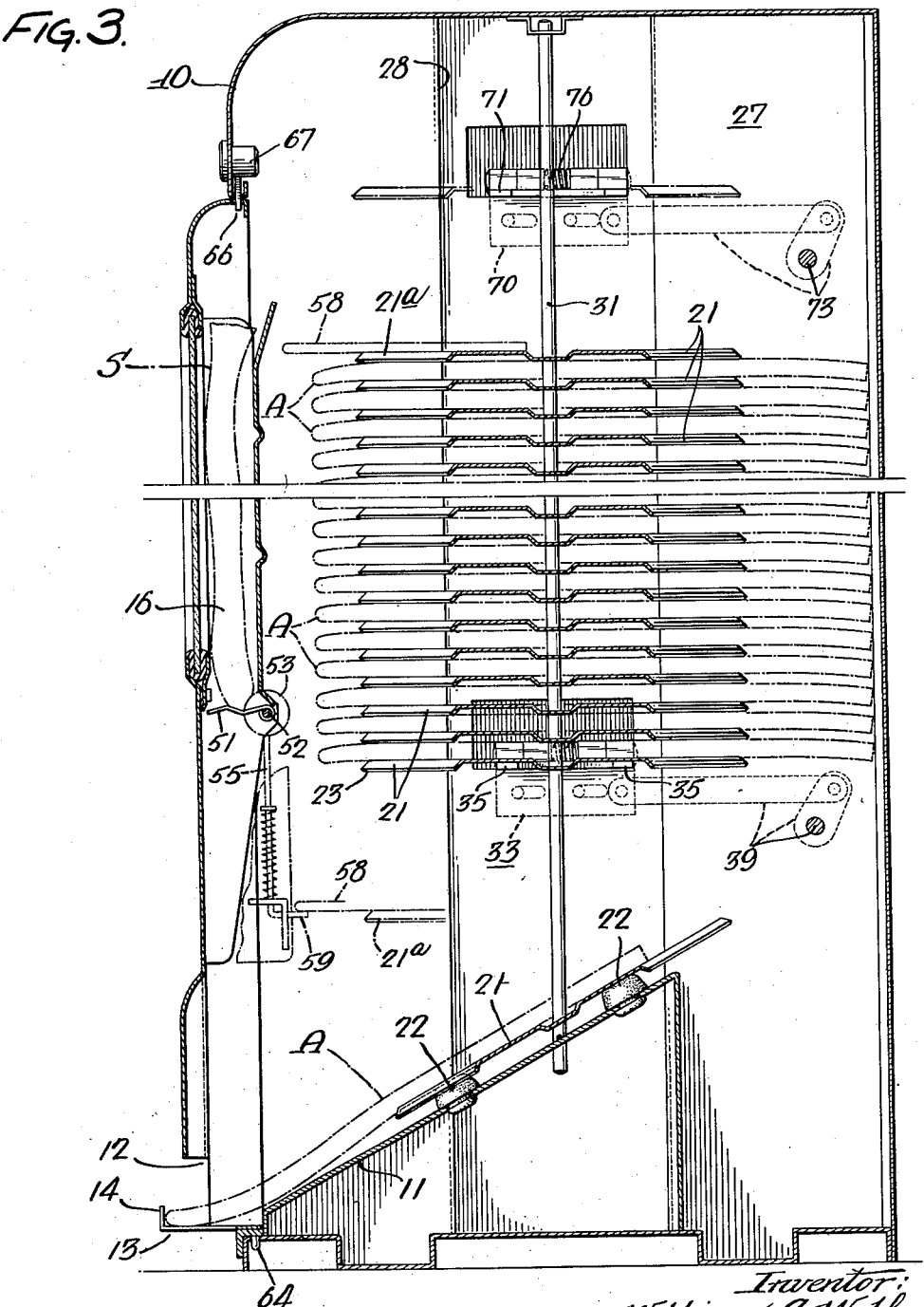

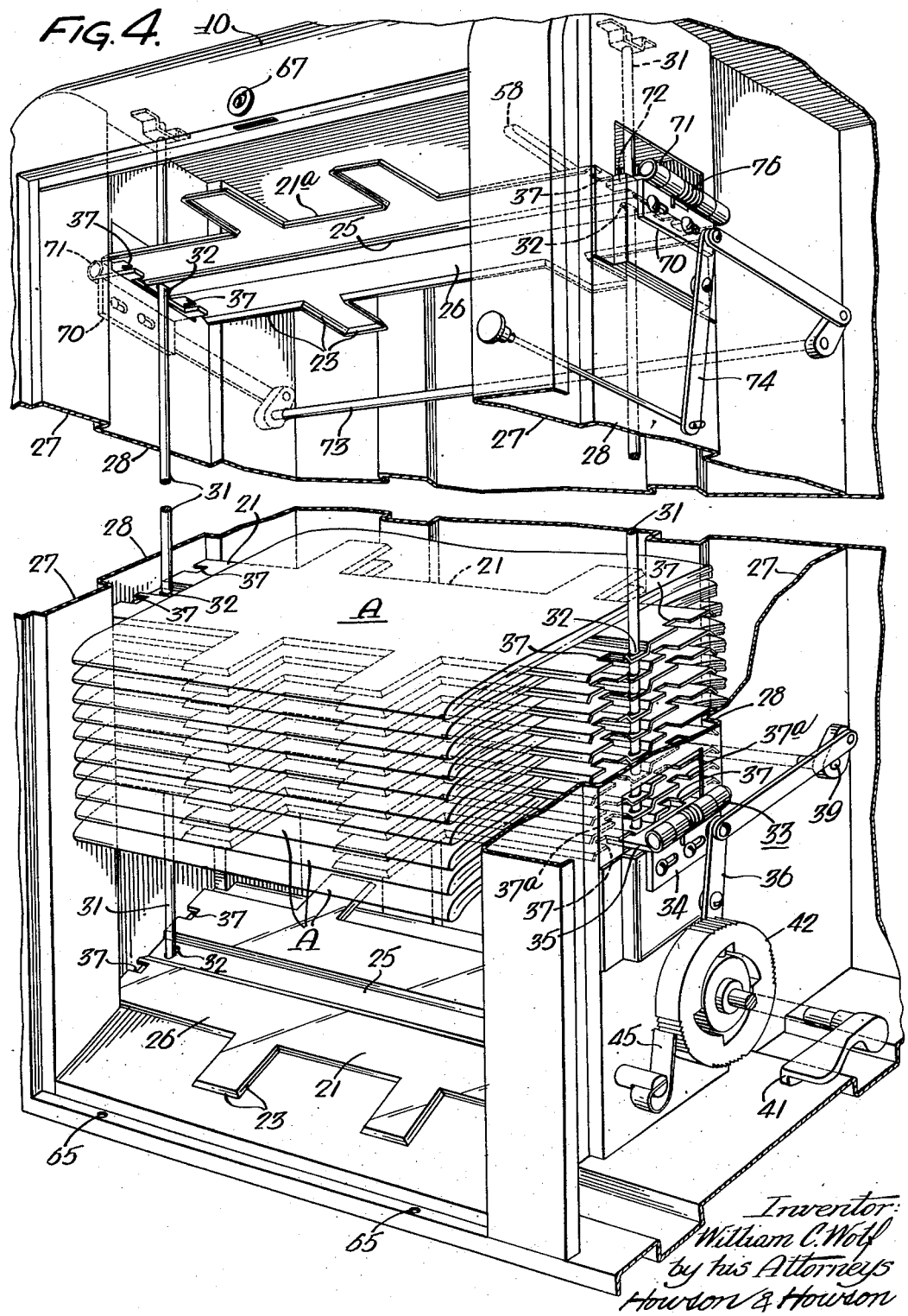

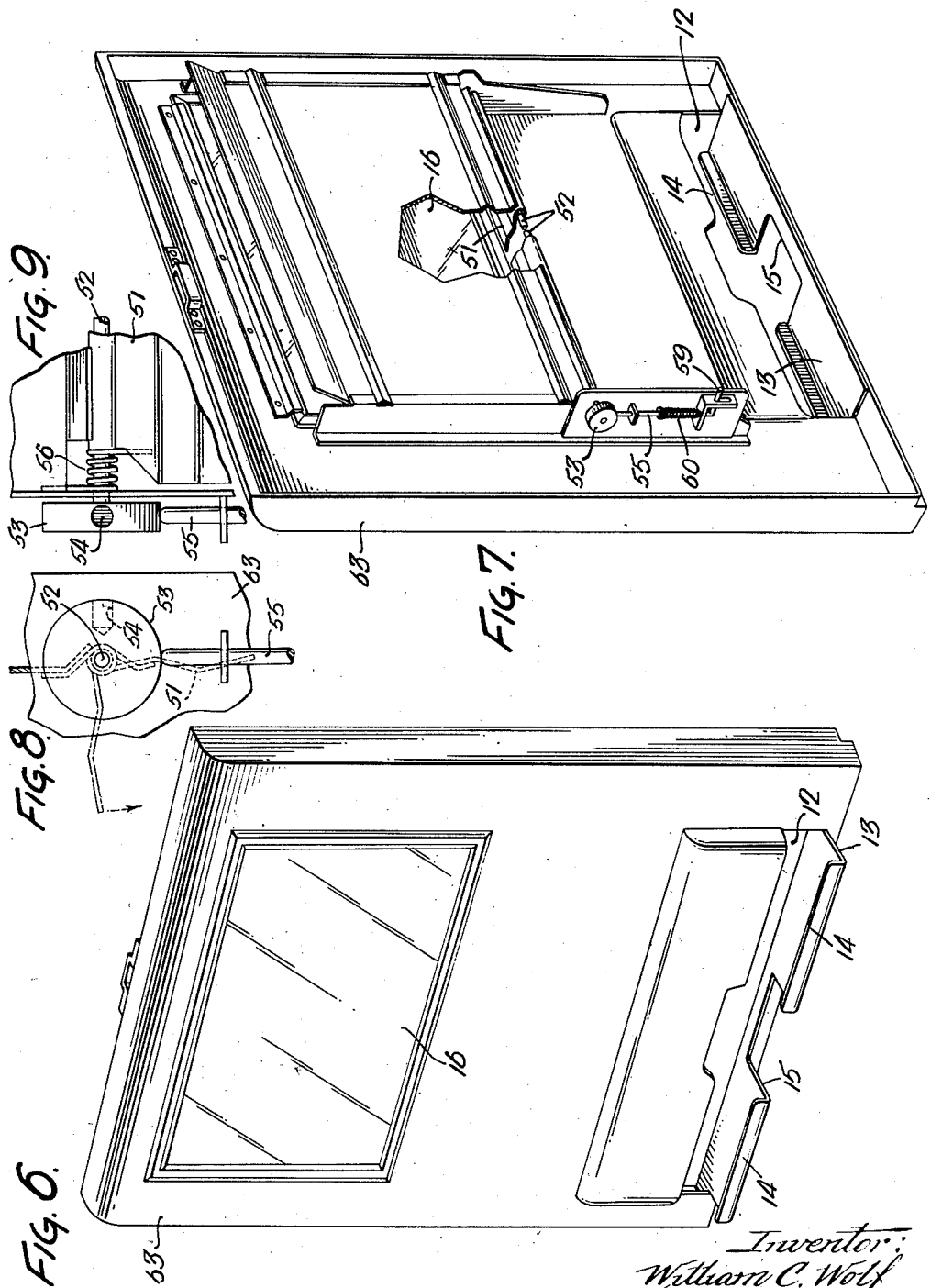

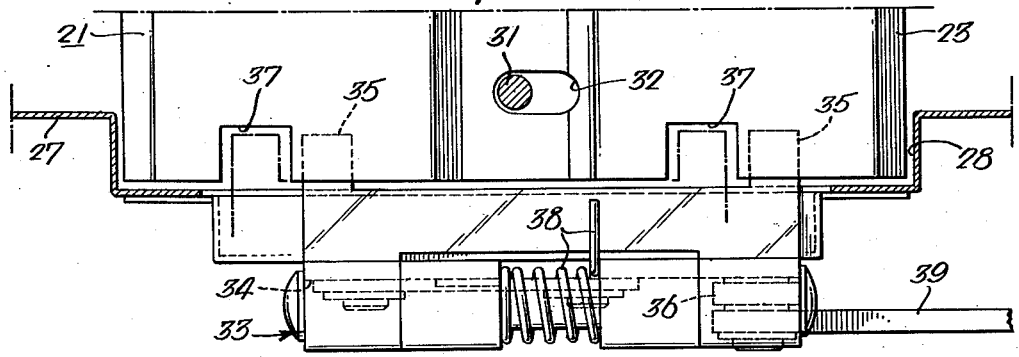
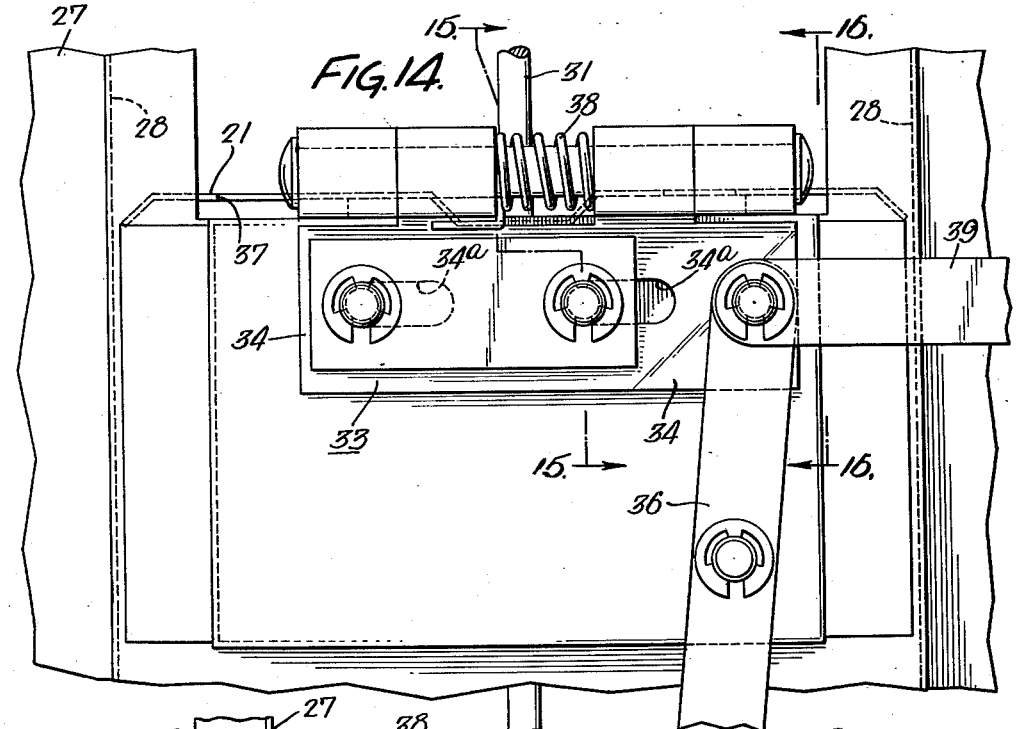
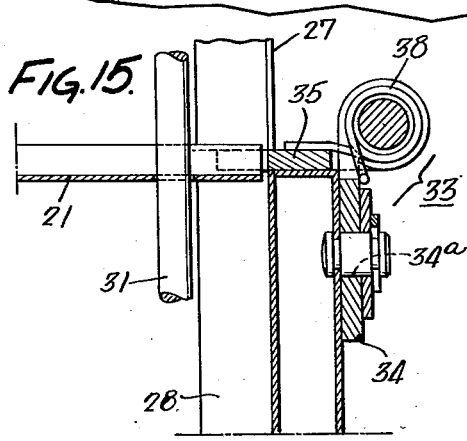
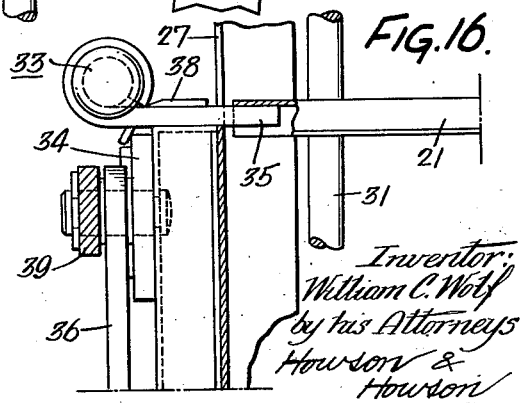

United States Patent Office 2,816,688
Patented Dec. 17, 1957

2,816,688

NEWSPAPER DISPENSING APPARATUS

William C. Wolf, York, Pa., assignor, by mesne assignments, to Automatic Newsvending Corporation, Clayton, Mo., a corporation of Missouri Application March 17, 1954, Serial No. 416,788

16 Claims. (Cl. 221—8)

The present invention relates to article dispensing apparatus and has particular application to vending machines for newspapers and like articles.

In conventional vending machines for newspapers and the like, the newspapers are stored in a closely stacked relationship and means is provided to strip a paper from one end of the stack. To provide proper stripping of the paper, rather complex mechanism is required which in turn necessitates connections to an external power source for actuating the mechanism. In addition, the mechanism must be accurately adjusted to strip the papers from the stack individually so as to prevent discharge of more than one paper at a time. Newspapers often vary in thickness from one edition to another, and the mechanism must therefore be adjusted when changing editions in order to compensate for the variations in thickness.

To obviate the necessity for adjusting mechanism for articles of different size, it has been proposed to store the articles to be dispensed in individual compartments or shelves, actuating means being provided to discharge the articles from successive compartments. This has not been satisfactory for newspapers and like articles since the papers have a tendency to jam in the machine, or become damaged as they are discharged. In addition, the compartments must be dimensioned to accommodate the largest sized paper and a substantial amount of wasted space is necessary to afford easy loading of the machine.

With the foregoing in mind, a primary object of the present invention is to provide article dispensing apparatus which operates without the necessity for adjustment to compensate for changes in the size of the dispensed article.

Another object is to provide apparatus of the type described having means affording simple loading of the apparatus.

A further object is to provide novel article dispensing apparatus which is operated by simple actuation of the operating lever and without the need for connections to an external source of power.

These and other objects of the invention and the various features and details of the construction and operation thereof are more fully set forth hereinafter with reference to the accompanying drawings in which:

Fig. 1 is a front elevational view of an apparatus made in accordance with the present invention with a portion broken away to show the construction of the article release device;

Fig. 2 is a side elevational view of the apparatus shown in Fig. 1 with a portion broken away;

Fig. 3 is a vertical sectional view taken on the line 3—3 of Fig. 1 showing the apparatus discharging the first article;

Fig. 4 is an exploded perspective view of the apparatus showing the position of the parts prior to the final loading operation;

Fig. 5 is a horizontal view taken on the line 5—5 of Fig. 1;

Fig. 6 is a detached perspective view of the cover member;

Fig. 7 is a view similar to Fig. 6 showing the reverse side of the cover member;

Fig. 8 is a fragmentary elevational view of the release mechanism for the article in the display compartment;

Fig. 9 is a rear elevational view of the release mechanism shown in Fig. 8;

Fig. 10 is a fragmentary vertical sectional view taken on the line 10—10 of Fig. 1 and showing in elevation the operating cam for the article release device;

Fig. 11 is a sectional view through the cam illustrated in Fig. 10;

Fig. 12 is a fragmentary view similar to Fig. 10 showing in elevation the opposite face of the operating cam;

Fig. 13 is an enlarged plan view of the latch release element showing the details of the construction and operation thereof;

Fig. 14 is an elevational view of the element shown in Fig. 13; and,

Figs. 15 and 16 are sectional views taken on the lines 15—15 and 16—16 respectively of Fig. 14.

Referring now to the drawings, the article dispensing machine illustrated therein comprises a housing 10 having disposed therein an inclined base 11. The base 11 slopes downwardly and outwardly and terminates adjacent an opening 12 for discharging the article. A tray member 13 projects from the opening and has an upturned lip 14 for supporting the discharged article in view of the operator. As seen in Figs. 1 and 6, the tray is provided with a suitable aperture 15 providing a hand grip for the article. Above the opening 12, a display compartment 16 is provided in which a sample copy S of the article is displayed.

Referring to Fig. 3, a plurality of articles A are stacked on shelves 21 within the casing 10. The shelves are mounted for free vertical movement in the casing, each shelf supporting an article A which, in turn, supports the upwardly adjacent shelf. The shelves are adapted to drop successively onto the base 11 against bumper elements 22 mounted on the base to prevent damage to the shelves and the base. As each shelf is dropped onto the bumpers 22, as will be described more fully hereinafter, the article supported thereby is permitted to slide downwardly on the base 11 into the tray 13. The operator then removes the article. In the next operation, the succeeding shelf is dropped and the article supported thereby is allowed to slide into the tray 13. It is noted that the succeeding shelf 21 falls onto the preceding shelf when it is allowed to drop onto the base member 11.

To conserve space and material and at the same time impart maximum rigidity to the shelf members, the shelves are formed to nest one within the other and are provided with peripheral flanges 23, which, as shown in Figs. 3 and 4, project angularly downward so that the successive shelves will nest one within the other on the base 11. To provide further reinforcement, a channel 25 is provided in the body portion 26 of the shelf 21. The channels 25 of successive shelves are also adapted to nest within each other.

In order to insure proper nesting of the shelves on the base 11 and prevent lateral displacement of the shelves in the housing 10, guide means is provided for the shelves. The side walls 27 of the housing 10 are formed with vertical channels 28 which receive the body portion 26 of the shelf for sliding movement therein. Further guiding is provided by rods 31 mounted within the channels 28 and adapted to pass through each shelf 21 of the series. To this end, the channel 25 of each shelf is formed with an elongated aperture 32 adjacent each end thereof to receive the guide rods 31.

In accordance with the invention, means is provided to support the shelves 21 at an elevated level and to afford successive discharge of the individual shelves from this level. To this end, a latch member 33 is mounted on each side wall 27. Each latch member comprises a base element 34 having transversely disposed slots 34a mounting the latch for transverse reciprocation relative to the side wall 27. Finger members 35 are hingedly secured to the base element 34 and project through the channel 28 into engagement with the shelves 21.

Means is provided at 36 for oscillating the latch 33 between the forward and back limit positions. As shown in Figs. 5 and 13 wherein the fingers are in their back limit position, the shelf 21 is supported at an elevated level by the fingers. Upon displacement of the fingers to their forward limit position (shown in broken lines in Fig. 13), they register with apertures 37 formed in the shelf. The shelf then drops onto the base 11 to discharge the article supported thereon into the tray 13. The latch is retained in its forward limit position and will support the next succeeding shelf which has apertures 37a offset rearwardly relative to the apertures 37 (see Fig. 4). In the next operation, the fingers are displaced to the rearward limit position so as to register with the apertures 37a and permit the next shelf to drop onto the base 11. Thus, each transverse displacement of the latch 33 discharges a single shelf onto the base 11. The fingers 37 of each latch 33 are biased downwardly, for example by a spring 38 to project into the channel 28 of the side wall 27, whereby the fingers may be pivotally displaced upwardly against the bias of the spring 38 for a purpose more fully set forth hereinafter.

The latches 33 at the opposite sides of the housing 10 are ganged to operate in unison, for example as indicated at 39. The latches are operated by pivotal movement of a handle lever 41 which actuates a cam 42, for example, by a spring biased pin indicated at 43. Thus, rotation of the lever 41 for a distance greater than 90 degrees will displace the cam angularly a distance of only 90 degrees. A 90 degree displacement of the cam 42, by means of the cam follower 44, displaces the latch member 33 from one limit position to the other. A ratchet mechanism may be provided on the cam 42, for example, as indicated at 45 to prevent inadvertent free movement of the cam. A conventional coin-operated clutch mechanism 46 is interposed between the lever 41 and the cam 42 so that the lever will operate the cam only when the proper coins are inserted in the device. The coin-operated device is of conventional design and the details are not shown herein.

When all the articles contained on the shelves 21 are discharged, operation of the lever 41 discharges the sample article S from the display compartment 16. To this end, the display compartment is provided with a trap door bottom 51 which is released when the topmost shelf 21a is discharged by the latch members 33. To this end, the bottom 51 is rigidly mounted on a shaft 52 having a release cam 53 mounted at one end thereof. The release cam is provided with an aperture 54 in its circumferential surface which is adapted to receive a plunger 55. A spring 56 biases the trap door to an open position but when the machine is loaded, the bottom 51 is held closed by engagement of the plunger 55 within the aperture 54. To release the sample article S, the plunger 55 is displaced downwardly to allow the spring bias 56 to drop the bottom 51 and permit the article S to fall directly into the tray 13. If desired, the rear wall of the display compartment 16 may be provided with suitable indicia to indicate that the machine is empty.

To displace the plunger 55 downwardly and release the sample article S, the uppermost shelf 21a is provided with an actuating finger 58. The finger 58 is in registry with the outturned end 59 of the plunger 55 so that when the shelf 21a falls after being released by the latches 33, the finger 58 engages the portion 59 of the plunger and disengages it from the cam wheel 53, thereby allowing the spring 56 to open the display compartment 16. The plunger 55 is biased to its upper limit position by a spring, for example, as indicated at 60 in Figs. 3 and 7.

When the shelf 21a is dropped and the sample article S is discharged, the machine is completely empty. To replenish the supply of articles, the cover 63 is removed. The stack of shelves resting on the bumpers 22 is elevated to an upper level a substantial distance above the latches 33. In this respect, it is noted that the fingers 35 are displaced upwardly against the bias of the spring 38 to permit the sleeves to pass by the latches 33. Means is provided at 70 to support and drop the shelves individually from the upper level onto the latches 33 so that the articles A may be placed successively on the individual shelves 21. When all the shelves 21 are filled, the topmost shelf 21a is dropped onto the stack of articles. The display compartment 16 is closed by forcing the bottom 51 against the bias of the spring 56 to closed position where it is held by engagement of the plunger 55 in the aperture 54 of the cam wheel 53. The sample article S is then inserted in the display compartment and the cover 63 replaced on the front of the machine.

The cover 63 is removably secured to the housing by pins 64 projecting downwardly from the bottom thereof. The pins 64 seat in recesses 65 in the housing and the cover may be swung upwardly to be engaged by the keeper 66 of a conventional barrel lock 67. To remove the cover again, the keeper 66 is pivoted upwardly and the cover 63 allowed to fall outwardly to open up the machine for loading.

The means 70 for supporting the empty shelves 21 at the upper level above the latches 33 is substantially identical to the construction of the latches 33. To this end, latches 71, 71 are mounted for horizontal reciprocation on the walls 27, 27. Each latch is provided with inwardly projecting fingers 72, 72 which are reciprocated with the latch 71 into alternate registry with the apertures 37, 37 in successive shelves 21. The latches 71 are ganged to operate in unison, for example, as indicated at 73, and a lever is provided at 74 for actuating the latches. A handle 75 is operatively connected to the lever 74 and projects through the forward wall of the casing in a position behind the cover member 63, whereby when the cover is in place on the casing, the handle 75 will be contained therein. The fingers 72 are pivoted on the latch 71 and are biased downwardly by a spring 76. Thus, when the shelves 21 are displaced upwardly past the latches 71, 71, the finger moves upwardly against the bias of the spring 76. When all the shelves are above the upper level, the spring 76 biases the finger downwardly to provide a support for the shelves when they are released.

When loading the machine, the cover member 63 is removed and the empty shelves 21 which are resting on the bumpers 22, are displaced upwardly past the latches 33 and the latches 71 and permitted to rest on the fingers of the latches 71 at the upper level. The lowermost shelf 21 is then dropped to rest on the latches 33, 33 at the intermediate level by actuating the handle 75. A paper is then placed on the shelf 21 and the handle 75 actuated again to drop the succeeding shelf onto the paper. A second paper is then placed on this shelf and the handle 75 again actuated. When all the shelves are thus filled, the last shelf 21a which has the finger 58 mounted thereon, is dropped onto the stack of loaded shelves. The sample newspaper S is then placed in the display compartment and the cover 63 is replaced on the casing.

If it is desired to place less than a full load of articles in the machine, the operator selects only the desired number of shelves from the bumper 22 and raises them to the upper level above the latches 71. The loading is then performed in the same manner so that the uppermost shelf 21a discharges the sample article S in the display compartment. It is also possible to detachably mount the finger 58 on the uppermost shelf so that it is not necessary to count out the number of shelves to correspond with the desired number of articles to be stored in the machine. When the machine is modified in this manner, the articles are loaded in the same manner as described before and when the supply is exhausted, the finger 58 is mounted on the empty tray 21 which rests on the last article inserted in the machine. Thus, when this last article is dispensed, the finger will actuate the trap door 51 to discharge the sample article from the display compartment.

While a particular embodiment of the invention has been herein illustrated and described, it is not intended to limit the invention to such disclosure, and changes and modifications may be made therein and thereto within the scope of the following claims.

I claim:

1. In article dispensing apparatus, a casing, a plurality of substantially horizontal support elements arranged vertically one above the other and each comprising a substantially flat portion to support an article to be dispensed, means to guide said elements for substantially vertical movement in said casing between an upper level, an intermediate loading level, and a lower discharge level, means defining a discharge opening in said casing adjacent said lower level for dispensing the articles, a first means for supporting the elements in stacked and nested relationship at said upper level comprising a latch actuatable to release the lowermost element and support the next upper element and the remainder of said stack, said released element being displaced by gravity and guided by said guide means to said intermediate level, a second means to support an element at said intermediate level for loading thereon an article to be dispensed, said loaded element being adapted to support the next upper element and the remainder of said stack at said intermediate loading level upon their release from said upper level, said second means for supporting said released and loaded elements in stacked relation comprising a latch actuatable to release the lowermost element of said stack and support the next upper element and the remainder of said stack, said released element being moved by gravity and guided by said guide means to said lower level for dispensing said articles through said discharge opening.

2. In article dispensing apparatus, a casing, a plurality of substantially horizontal support elements arranged vertically one above the other and each comprising a substantially flat portion to support an article to be dispensed, means to guide said elements for substantially vertical movement in said casing between an upper level, an intermediate loading level, and a lower discharge level, means defining an access opening in said casing adjacent said intermediate level for loading the articles on the elements at said level, means normally closing said access opening, means defining a discharge opening in said casing adjacent said lower level for dispensing the articles, a first means for supporting the elements in stacked and nested relationship at said upper level comprising a latch actuatable to release the lowermost element and support the next upper element and the remainder of said stack, said released element being displaced by gravity and guided by said guide means to said intermediate level, a second means to support an element at said intermediate level for loading thereon an article to be dispensed, said loaded element being adapted to support the next upper element and the remainder of said stack at said intermediate loading level upon their release from said upper level, said second means for supporting said released and loaded elements in stacked relation comprising a latch actuatable to release the lowermost element of said stack and support the next upper element and the remainder of said stack, said released element being moved by gravity and guided by said guide means to said lower level for dispensing said articles through said discharge opening.

3. In article dispensing apparatus, a casing, a plurality of support elements arranged vertically one above the other and each comprising a substantially flat portion to support an article to be dispensed, means to guide said elements for substantially vertical movement in said casing between an upper level, an intermediate loading level, and a lower discharge level, means defining a discharge opening in said casing adjacent said lower level for dispensing the articles, a first means for supporting the elements in stacked and nested relationship at said upper level comprising a latch and actuatable to release the lowermost element and support the next upper element and the remainder of said stack, said released element being displaced by gravity and guided by said guide means to said intermediate level, a second means to support an element at said intermediate level for loading thereon an article to be dispensed, said loaded element being adapted to support the next upper element and the remainder of said stack at said intermediate loading level upon their release from said upper level, said second means for supporting said released and loaded elements in stacked relation comprising a latch actuatable to release the lowermost element of said stack and support the next upper element and the remainder of said stack, said released element being moved by gravity and guided by said guide means to said lower level, and means at said lower level for tilting said support element to dispense said articles through said discharge opening.

4. In article dispensing apparatus, a casing, a plurality of substantially horizontal support elements arranged vertically one above the other and each comprising a substantially flat portion to support an article to be dispensed and having apertures at opposite edges thereof, alternate elements having their apertures offset from the apertures of the intermediate elements, means to guide said elements for substantially vertical movement in said casing between an upper level, an intermediate loading level, and a lower discharge level, means defining a discharge opening in said casing adjacent said lower level for dispensing the articles, a first means for supporting the elements in stacked and nested relationship at said upper level comprising a latch reciprocable between forward and back limit positions and including flat fingers projecting horizontally into registry with the apertures of the alternate support elements in one position and the apertures of the intermediate support elements in the other position, actuatable to said one position to release the lowermost alternate support element and support the next upper intermediate element and the remainder of said stack, said latch element actuable to the other position to release the succeeding intermediate support element and support the next upper alternate element and the remainder of said stack, each of said released elements being displaced by gravity and guided by said guide means to said intermediate level, a second means to support an element at said intermediate level for loading thereon an article to be dispensed, said loaded element being adapted to support the next upper element and the remainder of said stack at said intermediate loading level upon their release from said upper level, said second means for supporting said released and loaded elements in stacked relation comprising a latch actuatable to release the lowermost element of said stack and support the next upper element and the remainder of said stack, said released element being moved by gravity and guided by said guide means to said lower level for dispensing said articles through said discharge opening.

5. A device according to claim 4 wherein said second support means comprises a latch reciprocable between forward and back limit positions and having flat fingers projecting horizontally into the path of said support elements in registry with the apertures of the alternate support elements in one of said forward and back positions and in registry with the apertures of the alternate support elements in the other of said positions.

6. A device according to claim 5 wherein said latch fingers are pivotally mounted to normally project into the path of the support elements, said fingers being displaceable upwardly into vertical position out of the path of said support elements to afford free passage of said support elements upwardly past said fingers, and including means biasing said fingers to the normal horizontal position in the path of said support elements.

7. In article dispensing apparatus, a casing, a plurality of substantially horizontal support elements arranged vertically one above the other and each comprising a substantially flat portion to support an article to be dispensed, means to guide said elements for substantially vertical movement in said casing between an upper level, an intermediate loading level, and a lower discharge level, means defining a discharge opening in said casing adjacent said lower level and for dispensing the articles, a first means for supporting the elements in stacked and nested relationship at said upper level comprising a latch actuatable to release the lowermost element and support the next upper element and the remainder of said stack, said released element being displaced by gravity and guided by said guide means to said intermediate level, a second means to support an element at said intermediate level for loading thereon an article to be dispensed, said loaded element being adapted to support the next upper element and the remainder of said stack at said intermediate loading level upon their release from said upper lever, said second means for supporting said released and loaded elements in stacked relation comprising a latch actuatable to release the lowermost element of said stack and support the next upper element and the remainder of said stack, said released element being moved by gravity and guided by said guide means to said lower level for dispensing said articles through said discharge opening, means for actuating said second support means, and coin-operated means to render said actuating means operative.

8. In article dispensing apparatus, a casing, a plurality of substantially horizontal support elements arranged vertically one above the other and each comprising a substantially flat portion to support an article to be dispensed, means to guide said elements for substantially vertical movement in said casing between an upper level, an intermediate loading level, and a lower discharge level, means defining a discharge opening in said casing adjacent said lower level and for dispensing the articles, a first means for supporting the elements in stacked and nested relationship at said upper level comprising a latch actuatable to release the lowermost element and support the next upper element and the remainder of said stack, said released element being displaced by gravity and guided by said guide means to said intermediate level, manual means for actuating said first support means, and a second means to support an element at said intermediate level for loading thereon an article to be dispensed, said loaded element being adapted to support the next upper element and the remainder of said stack at said intermediate loading level upon their release from said upper level, said second means for supporting said released and loaded elements in stacked relation comprising a latch actuatable to release the lowermost element of said stack and support the next upper element and the remainder of said stack, said released element being moved by gravity and guided by said guide means to said lower level for dispensing said articles through said discharge opening.

9. In article dispensing apparatus, a casing, a plurality of substantially horizontal support elements arranged vertically one above the other and each comprising a substantially flat portion to support an article to be dispensed, means to guide said elements for substantially vertical movement in said casing between an upper level, an intermediate loading level, and a lower discharge level, means defining an access opening in said casing adjacent said intermediate level for loading the articles on the elements at said level, means normally closing said access opening, means defining a discharge opening in said casing adjacent said lower level and for dispensing the articles, a first means for supporting the elements in stacked and nested relationship at said upper level comprising a latch actuatable to release the lowermost element and support the next upper element and the remainder of said stack, said released element being displaced by gravity and guided by said guide means to said intermediate level, manual means for actuating said first support means, said manual means being disposed in said access opening and normally to be enclosed by said closure for the access opening, and a second means to support an element at said intermediate level for loading thereon an article to be dispensed, said loaded element being adapted to support the next upper element and the remainder of said stack at said intermediate loading level upon their release from said upper level, said second means for supporting said released and loaded elements in stacked relation comprising a latch actuatable to release the lowermost element of said stack and support the next upper element and the remainder of said stack, said released element being moved by gravity and guided by said guide means to said lower level for dispensing said articles through said discharge opening.

10. In article dispensing apparatus, a casing, a plurality of substantially horizontal support elements arranged vertically one above the other and each comprising a substantially flat portion to support an article to be dispensed, means to guide said elements for substantially vertical movement in said casing between an upper level, an intermediate loading level, and a lower discharge level, means defining a discharge opening in said casing adjacent said lower level and for dispensing the articles, a first means for supporting the elements in stacked and nested relationship at said upper level comprising a latch actuatable to release the lowermost element and support the next upper element and the remainder of said stack, said released element being displaced by gravity and guided by said guide means to said intermediate level, manual means for actuating said first support means, a second means to support an element at said intermediate level for loading thereon an article to be dispensed, said loaded element being adapted to support the next upper element and the remainder of said stack at said intermediate loading level upon their release from said upper level, said second means for supporting said released and loaded elements in stacked relation comprising a latch actuatable to release the lowermost element of said stack and support the next upper element and the remainder of said stack, said released element being moved by gravity and guided by said guide means to said lower level for dispensing said articles through said discharge opening, means for actuating said second support means, and coin-operated means to render said last-mentioned actuating means operative.

11. In article dispensing apparatus, a casing, a plurality of substantially horizontal support elements arranged vertically one above the other and each comprising a substantially flat portion to support an article to be dispensed, means to guide said elements for substantially vertical movement in said casing between an upper level, an intermediate loading level, and a lower discharge level, means defining an access opening in said casing adjacent said intermediate level for loading the articles on the elements at said level, means normally closing said access opening, means defining a discharge opening in said casing adjacent said lower level and for dispensing the articles, a first means for supporting the elements in stacked and nested relationship at said upper level comprising a latch actuatable to release the lowermost element and support the next upper element and the remainder of said stack, said released element being displaced by gravity and guided by said guide means to said intermediate level, manual means for actuating said first support means, said manual means being disposed in said access opening and normally to be enclosed by said closure for the access opening, a second means to support an element at said intermediate level for loading thereon an article to be dispensed, said loaded element being adapted to support the next upper element and the remainder of said stack at said intermediate loading level upon their release from said upper level, said second means for supporting said released and loaded elements in stacked relation comprising a latch actuatable to release the lowermost element of said stack and support the next upper element and the remainder of said stacks, said released element being moved by gravity and guided by said guide means to said lower level for dispensing said articles through said discharge opening, means for actuating said second support means, and coin-operated means to render said last-mentioned actuating means operative.

12. In article dispensing apparatus, a casing, a plurality of substantially horizontal support elements arranged vertically one above the other and each comprising a substantially flat portion to support an article to be dispensed, means to guide said elements for substantially vertical movement in said casing between an upper level, an intermediate loading level, and a lower discharge level, means defining an access opening in said casing adjacent said intermediate level for loading the articles on the elements at said level, means normally closing said access opening, means defining a discharge opening in said casing adjacent said lower level and for dispensing the articles, a first means for supporting the elements in stacked and nested relationship at said upper level comprising a latch having fingers normally disposed in the path of travel of said support elements, and actuatable to release the lowermost element and support the next upper element and the remainder of said stack, said released element being displaced by gravity and guided by said guide means to said intermediate level, manual means for actuating said first support means, said manual means being disposed in said access opening and operable to be enclosed by said closure for the access opening, a second means to support an element at said intermediate level for loading thereon an article to be dispensed, said loaded element being adapted to support the next upper element and the remainder of said stack at said intermediate loading level upon their release from said upper level, said second means for supporting said released and loaded elements in stacked relation comprising a latch having fingers normally disposed in the path of travel of said support elements and actuatable to release the lowermost element of said stack and support the next upper element being moved by gravity and guided by said guide means to said lower level for dispensing said articles through said discharge opening, means for actuating said second support means, coin-operated means to render said last-mentioned actuating means operative, means mounting each of the fingers of said first and second support means for pivotal movement upwardly and out of the path of travel of said support elements, and means biasing the fingers into the normal position in the path of travel of said support elements whereby the empty support elements may be manually elevated from said lower level past said fingers to said upper level.

13. In article dispensing apparatus having a discharge opening and a plurality of article support elements selectively movable successively to an article dispensing position, a display window for one of said articles disposed to form a display compartment at the front of said apparatus, a support for said one article forming the bottom of said compartment, means pivotally mounting said support for movement between a closed article supporting position and an open position in which the support is removed from said article to discharge the same through said discharge opening, means biasing said support to said open position, a cam mounted for pivotal movement coaxially with said support and having a radial aperture therein, a longitudinally displaceable pin mounted in alignment with said aperture in the closed support position of the cam, means biasing said pin into engagement with said aperture to normally maintain said support closed against its bias, and a projection on said pin disposed in the path of travel of a selected one of said article supporting elements for engagement thereby to disengage said pin from the cam aperture and cause the support to be opened and discharge the said one article from the display compartment.

14. In article dispensing apparatus having a discharge opening and a plurality of article support elements selectively movable successively to an article dispensing position, a display window for one of said articles disposed to form a display compartment at the front of said apparatus, a support for said one article forming the bottom of said compartment, a shaft journalled in the apparatus for pivotally mounting said support for movement between a closed article supporting position, and an open position in which the support is removed from said article to discharge the same through said discharge opening, a torsion spring biasing said shaft and support to said open position, a cam keyed to said shaft for pivotal movement coaxially with said support and having a radial aperture therein, a longitudinally displaceable pin mounted in alignment with said aperture in the closed support position of the cam, means biasing said pin into engagement with said aperture to normally maintain said support closed against its bias, and a projection on said pin disposed in the path of travel of a selected one of said article supporting elements for engagement thereby to disengage said pin from the cam aperture and cause the support to be opened and discharge the said one article from the display compartment.

15. In article dispensing apparatus, a plurality of substantially horizontal support elements arranged vertically one above the other and each comprising a substantially flat portion to support an article to be dispensed, means to guide said elements for substantially vertical movement between an upper level, an intermediate loading level, and a lower discharge level, a first means for supporting the elements in stacked and nested relationship at said upper level comprising a latch actuatable to release the lowermost element and to provide support for the next upper element and the remainder of the stack, said released element being displaced by gravity and guided by said guide means to said intermediate level, a second means to support said element at said intermediate level for loading thereon an article to be dispensed, said loaded element being adapted to support the next upper element and the remainder of the stack at said intermediate loading level upon their release from said upper level, said second supporting means comprising a latch actuatable to release from said intermediate level the lowermost element of said stack and provide support for the next upper element and the remainder of said stack, said released element being moved by gravity and guided by said guide means to said lower level for dispensing said articles.

16. In article dispensing apparatus, a plurality of substantially horizontal support elements arranged vertically one above the other and each comprising a substantially flat portion to support an article to be dispensed, means to guide said elements for substantially vertical movement between an upper level, an intermediate loading level, and a lower discharge level, a first means for supporting the elements in stacked and nested relationship at said upper level comprising a latch actuatable to release the lowermost element and to provide support for the next upper element and the remainder of said stack, a second means to support said element at said intermediate level for loading thereon an article to be dispensed, said loaded element being adapted to support the next upper element and the remainder of said stack at said intermediate loading level upon their release from said upper level, and said second supporting means comprising a latch actuatable to release from said intermediate level the lowermost element of said stack and provide support for the next upper element and the remainder of said stack.

(References on following page)

References Cited in the file of this patent

UNITED STATES PATENTS

| | | |
|---|---|---|
| 1,108,164 | Glines | Aug. 25, 1914 |
| 1,240,595 | Perfect | Sept. 18, 1917 |
| 1,669,717 | Lea | May 15, 1928 |
| 2,088,856 | Heiland | Aug. 3, 1937 |
| 2,501,434 | Cameron | Mar. 21, 1950 |
| 2,546,352 | Weaver | Mar. 27, 1951 |

FOREIGN PATENTS

| | | |
|---|---|---|
| 414,302 | Great Britain | of 1934 |